(12) United States Patent
Rausch et al.

(10) Patent No.: US 9,268,828 B2
(45) Date of Patent: Feb. 23, 2016

(54) COMPUTER-IMPLEMENTED SYSTEMS AND METHODS FOR EXTRACT, TRANSFORM, AND LOAD USER INTERFACE PROCESSING

(75) Inventors: Nancy Anne Rausch, Apex, NC (US); Peter Rowland Eastwood, Cary, NC (US); Andrew Shakinovsky, Apex, NC (US); Russell Edward Robison, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 176 days.

(21) Appl. No.: 13/160,718

(22) Filed: Jun. 15, 2011

(65) Prior Publication Data

US 2012/0324387 A1 Dec. 20, 2012

(51) Int. Cl.
*G06F 17/30* (2006.01)

(52) U.S. Cl.
CPC .............................. *G06F 17/30563* (2013.01)

(58) Field of Classification Search
USPC .......................................... 707/600, 602, 610
See application file for complete search history.

(56) References Cited

U.S. PATENT DOCUMENTS

| | | |
|---|---|---|
| 6,434,545 B1 | 8/2002 | MacLeod et al. |
| 6,553,371 B2 | 4/2003 | Gutierrez-Rivas et al. |
| 6,564,204 B1 | 5/2003 | Amundsen et al. |
| 6,640,221 B1 | 10/2003 | Levine et al. |
| 6,744,449 B2 | 6/2004 | MacLeod et al. |
| 6,836,777 B2 | 12/2004 | Holle |
| 6,980,981 B2 | 12/2005 | Beavin et al. |
| 7,007,007 B2 | 2/2006 | Slutz |
| 7,167,852 B1 | 1/2007 | Ahmed et al. |
| 7,299,216 B1* | 11/2007 | Liang .................. G06F 11/0727 |
| 7,461,077 B1 | 12/2008 | Greenwood |
| 7,580,941 B2 | 8/2009 | Narasayya et al. |
| 7,908,266 B2 | 3/2011 | Zeringue et al. |
| 2003/0177137 A1 | 9/2003 | MacLeod et al. |
| 2003/0197738 A1 | 10/2003 | Beit-Zuri et al. |
| 2005/0234979 A1 | 10/2005 | Martineau et al. |
| 2006/0100912 A1* | 5/2006 | Kumar .............. G06F 17/30864 705/4 |
| 2006/0242604 A1* | 10/2006 | Wong ................ G06F 17/30126 715/854 |
| 2007/0239769 A1* | 10/2007 | Fazal ................ G06F 17/30554 |
| 2008/0091647 A1 | 4/2008 | Gao Zhong et al. |
| 2008/0253306 A1* | 10/2008 | Manion ................... H04L 45/02 370/255 |
| 2009/0024940 A1 | 1/2009 | Zeringue et al. |
| 2009/0063517 A1 | 3/2009 | Wright et al. |
| 2009/0063547 A1 | 3/2009 | Wright et al. |
| 2009/0319544 A1* | 12/2009 | Griffin .............. G06F 17/30563 |
| 2009/0319546 A1* | 12/2009 | Shaik ................ G06F 17/30569 |

(Continued)

OTHER PUBLICATIONS

Stolte, Chris et al., "Polaris: A System for Query, Analysis, and Visualization of Multidimensional Databases," Communications of the ACM, vol. 51, ] No. 11, pp. 75-84 (Nov. 2008).*

(Continued)

*Primary Examiner* — Hosain Alam
*Assistant Examiner* — Ahmed Abraham
(74) *Attorney, Agent, or Firm* — Kilpatrick Townsend & Stockton, LLP

(57) ABSTRACT

Computer-implemented systems and methods are disclosed for specifying an Extract, Transform, Load (ETL) process. For example, systems and methods are provided for specifying the ETL process through ETL diagrams, and allowing ETL diagrams with different components to be easily traversed. Behaviors of underlying engine technology of the ETL process may be encapsulated so that users may build a job or data flow of the ETL process without knowing specific details of the underlying engine technology.

40 Claims, 13 Drawing Sheets

(56) References Cited

U.S. PATENT DOCUMENTS

| | | | |
|---|---|---|---|
| 2011/0295794 A1* | 12/2011 | Venkatasubramanian | G06F 17/30563 707/602 |
| 2011/0295795 A1* | 12/2011 | Venkatasubramanian | G06F 17/30563 707/602 |
| 2012/0109879 A1* | 5/2012 | Devadoss | G06F 17/30563 707/602 |
| 2012/0150791 A1* | 6/2012 | Willson | G06F 17/30563 707/600 |
| 2012/0265726 A1* | 10/2012 | Padmanabhan | G06F 17/303 707/602 |
| 2013/0132163 A1* | 5/2013 | Eder | G06Q 40/00 705/7.37 |

OTHER PUBLICATIONS

Stoke, Chris et al., "Polaris: A System for Query, Analysis, and Visualization of Multidimensional Databases," Communications of the ACM, vol. 51, No. 11, pp. 75-84 (Nov. 2008).

Killer Bite Software, "SQL Visualizer", http://www.sqlvisualizer.com/Features/ScreenShots/UserInterface.aspx [26 pp.].

* cited by examiner

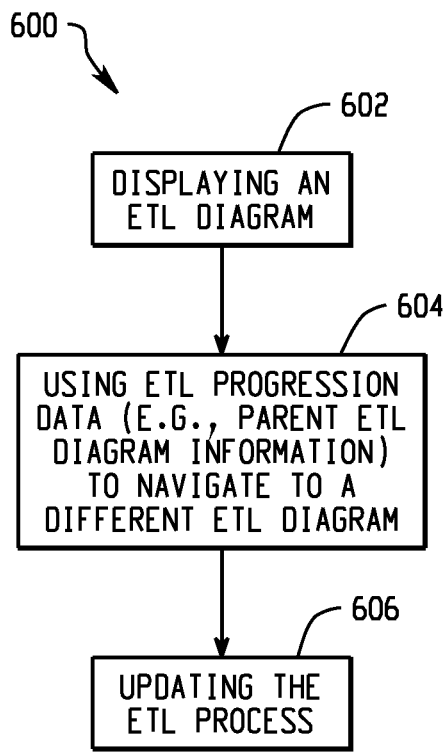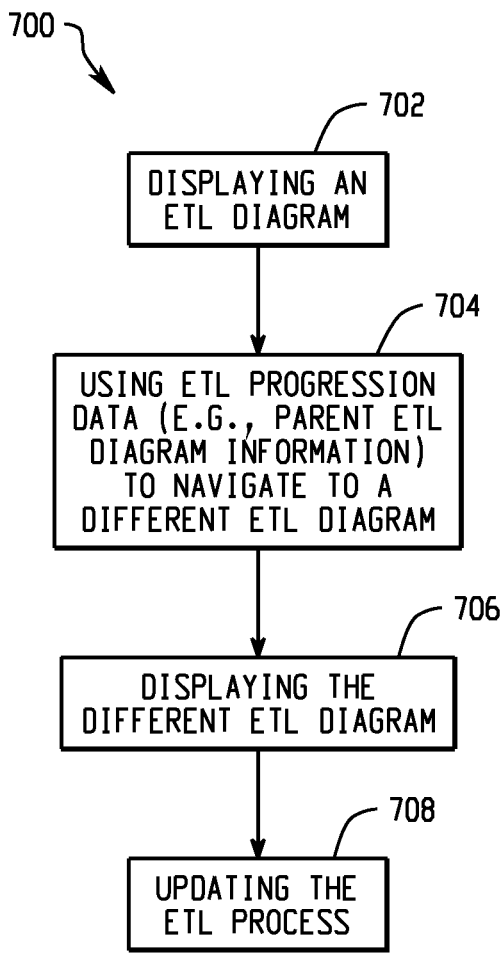
Fig. 6
Fig. 7

| STEP | ETL DIAGRAM | ETL PROGRESSION DATA STRUCTURE | WHEN THE USER OPENS | WHAT HAPPENS NEXT |
|---|---|---|---|---|
| 1 | LEVEL 1 | [LEVEL 1] | NODE 1 IN LEVEL 1 | GO TO STEP 2 |
| 2 | NODE 1 (LEVEL 2) | [LEVEL 1] [NODE 1] | NODE 2 IN LEVEL 2 | GO TO STEP 3 |
| 3 | NODE 2 (LEVEL 3) | [LEVEL 1] [NODE 1] [NODE 2] | LEVEL 1 | GO TO STEP 4 |
| 4 | LEVEL 1 | [LEVEL 1] [NODE 1] [NODE 2] | NODE 1 (LEVEL 2) | GO TO STEP 5 |
| 5 | NODE 1 (LEVEL 2) | [LEVEL 1] [NODE 1] [NODE 2] | NODE 2 (LEVEL 3) | GO TO STEP 6 |
| 6 | NODE 2 (LEVEL 3) | [LEVEL 1] [NODE 1] [NODE 2] | NODE 1 (LEVEL 2) | GO TO STEP 7 |
| 7 | NODE 1 (LEVEL 2) | [LEVEL 1] [NODE 1] [NODE A] | NODE A IN NODE 1 (LEVEL 2) | GO TO STEP 8 |
| 8 | NODE A (LEVEL 3) | [LEVEL 1] [NODE 1] [NODE A] | NODE B IN NODE 1 (LEVEL 3) | GO TO STEP 9 |
| 9 | NODE B (LEVEL 4) | [LEVEL 1] [NODE 1] [NODE A] [NODE B] | LEVEL 1 | GO TO STEP 10 |
| 10 | LEVEL 1 | [LEVEL 1] [NODE 1] [NODE A] [NODE B] | NODE Z IN LEVEL 1 | GO TO STEP 11 |
| 11 | NODE Z (LEVEL 2) | [LEVEL 1] [NODE Z] | NODE P IN NODE Z (LEVEL 2) | GO TO STEP 12 |
| 12 | NODE P (LEVEL 3) | [LEVEL 1] [NODE Z] [NODE P] | | |

*Fig. 15*

COMPUTER-IMPLEMENTED SYSTEMS AND METHODS FOR EXTRACT, TRANSFORM, AND LOAD USER INTERFACE PROCESSING

TECHNICAL FIELD

The present disclosure relates generally to the field of Extract, Transform, and Load user interface processing and, more specifically, to computer-implemented systems and methods for Extract, Transform, and Load user interface processing.

BACKGROUND

An Extract, Transform, and Load (ETL) process (e.g., a data management process) is used for data warehousing that consolidates data from multiple data sources. The first step in the ETL process is extracting data from various external sources. Each of the sources may store its data in completely different format from the rest. Almost any data storage can be used as a source for the ETL process. Once the data has been extracted and converted in an expected format, the next step in the ETL process is transforming the data according to a set of business rules/functions. The data transformation may include various operations including filtering, sorting, aggregating, joining data, cleaning data, generating calculated data based on existing values, and validating data. The final step of the ETL process involves loading the transformed data into a destination target, which may be a database or a data warehouse.

Examples of the source data for the ETL process can include data from different departments and/or divisions of a company that needs to be integrated. For example, a company's management team may need complete, accurate information of customers, suppliers and transactions of the company to make sound business decisions. This information is often not maintained at a single place, but rather at different locations/sources throughout the company across multiple departments, divisions and applications. The ETL process can extract data from different data sources within the company, transform the data, and populate the data into a data warehouse, so that the management team can do reporting, query, analysis, performance management and take effective business decisions.

The ETL process has many applications, including but not limited to data migration and application integration for multiple dispersed data sources. For example, in data migration, various data sources may be involved, and data may be generated and consumed by software applications which in turn support business processes. The ETL process can assist data flows among the data sources in multiple directions.

SUMMARY

As disclosed herein, computer-implemented systems and methods are provided for specifying an Extract, Transform, Load (ETL) process. For example, systems and methods are provided for specifying the ETL process through ETL diagrams, and allowing ETL diagrams with different components to be easily traversed. Behaviors of underlying engine technology of the ETL process may be encapsulated so that users may build a job or data flow of the ETL process without knowing specific details of the underlying engine technology.

As another example, the ETL process may be represented through a hierarchy of levels. An ETL diagram is displayed on a user interface, including a display of parent ETL diagram information and provides an indication of which ETL components are allowable specifically for the displayed ETL diagram. Determination as to which ETL components are allowable for the displayed ETL diagram is based upon the parent ETL diagram information associated with the displayed ETL diagram. The parent ETL diagram information on the displayed ETL diagram is used to navigate to a different ETL diagram within the hierarchy. The ETL process is updated based upon allowable components that were selected with respect to the displayed ETL diagram and the different ETL diagram.

As additional examples, a level in the hierarchy of levels that represent the ETL process comprises one or more ETL diagrams having ETL components representative of one of more ETL-related entities or actions. An ETL diagram is displayed on a graphical user interface. The displayed ETL diagram includes a display of parent ETL diagram information and provides an indication of which ETL components are allowable specifically for the displayed ETL diagram. Determination as to which ETL components are allowable for the displayed ETL diagram is based upon the parent ETL diagram information associated with the displayed ETL diagram. The parent ETL diagram information on the displayed ETL diagram is used to navigate to a different ETL diagram within the hierarchy. The ETL process is updated based upon allowable components that were selected with respect to the displayed ETL diagram and the different ETL diagram. The updated ETL process is used by a computer system to process data from one or more data sources for loading into one or more data targets.

BRIEF DESCRIPTION OF THE DRAWINGS

FIGS. 6-8 depict different examples of a flow chart of ETL user interface processing.

FIG. 15 depicts an example of how the user may navigate among different levels of the ETL process based on the memory technique.

DETAILED DESCRIPTION

Figure 1:
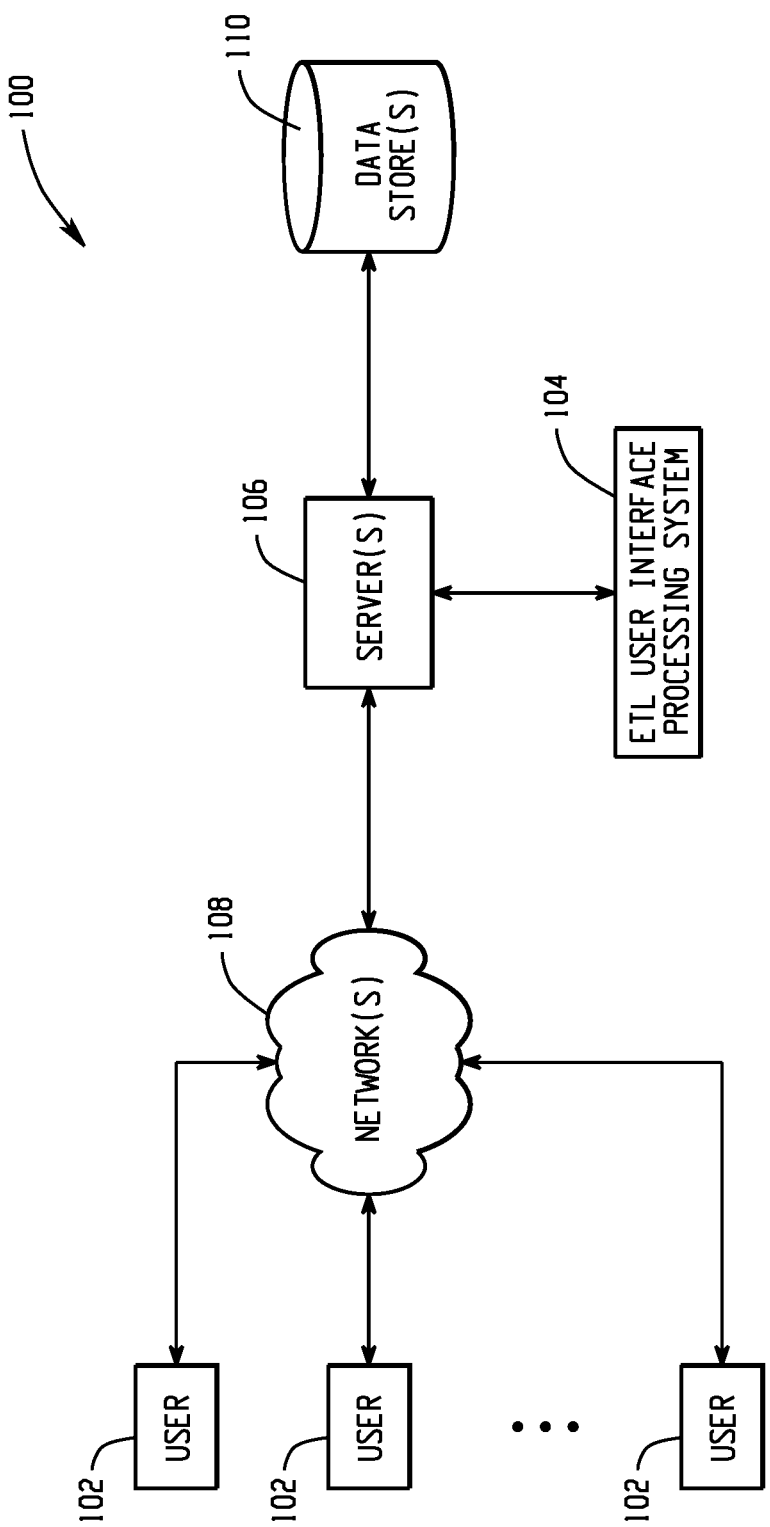
FIG. 1 depicts a computer-implemented environment wherein users can interact with an ETL user interface processing system hosted on one or more servers through a network.

FIG. 1 depicts a computer-implemented environment wherein users 102 can interact with an ETL user interface processing system 104 hosted on one or more servers 106 through a network 108. The ETL user interface processing system 104 can help the users 102 build, review or modify an ETL process (e.g., a data management process).

For example, a company's management team may need complete, accurate information of customers, suppliers and transactions of the company to make sound business decisions. This information is often not maintained at a single place, but rather at different locations/sources throughout the company across multiple departments, divisions and applications. The ETL user interface processing system 104 can assist the users 102 to build an ETL process to extract data from different data sources within the company, transform the data, and populate the data into one or more data targets, so that the management team can do reporting, query, analysis, performance management and make effective business decisions. The data sources may include databases, message queues, tables, unstructured documents, structured documents, and pipes from web services calls. The data targets may include databases and data warehouses. As another example, the ETL user interface processing system 104 may assist the users 102 to manage web services, integrate data flows, build message queues, and/or document a table of relationship.

In some situations, the ETL user interface processing system 104 may be used for the users 102 to build, review or modify an ETL process even if the users 102 are not familiar with the specifics of underlying engine technology of the ETL process, such as data cleansing techniques, data validation rules, and transformation logic/rules.

The ETL user interface processing system 104 may represent the ETL process through a hierarchy of levels, where a level in the hierarchy may include one or more ETL diagrams to be displayed in a user interface, such as a graphical user interface (GUI). A displayed ETL diagram may contain only visual components including actions and behaviors allowed at a level of the ETL process so that the users 102 may interact with the displayed ETL diagram to build, review, or modify the ETL process without knowing the specifics of the underlying engine technology.

As shown in FIG. 1, the users 102 can interact with the ETL user interface processing system 104 through a number of ways, such as over one or more networks 108. One or more servers 106 accessible through the network(s) 108 can host the ETL user interface processing system 104. The one or more servers 106 can also contain or have access to one or more data stores 110 for storing data for the ETL user interface processing system 104.

Figure 2:
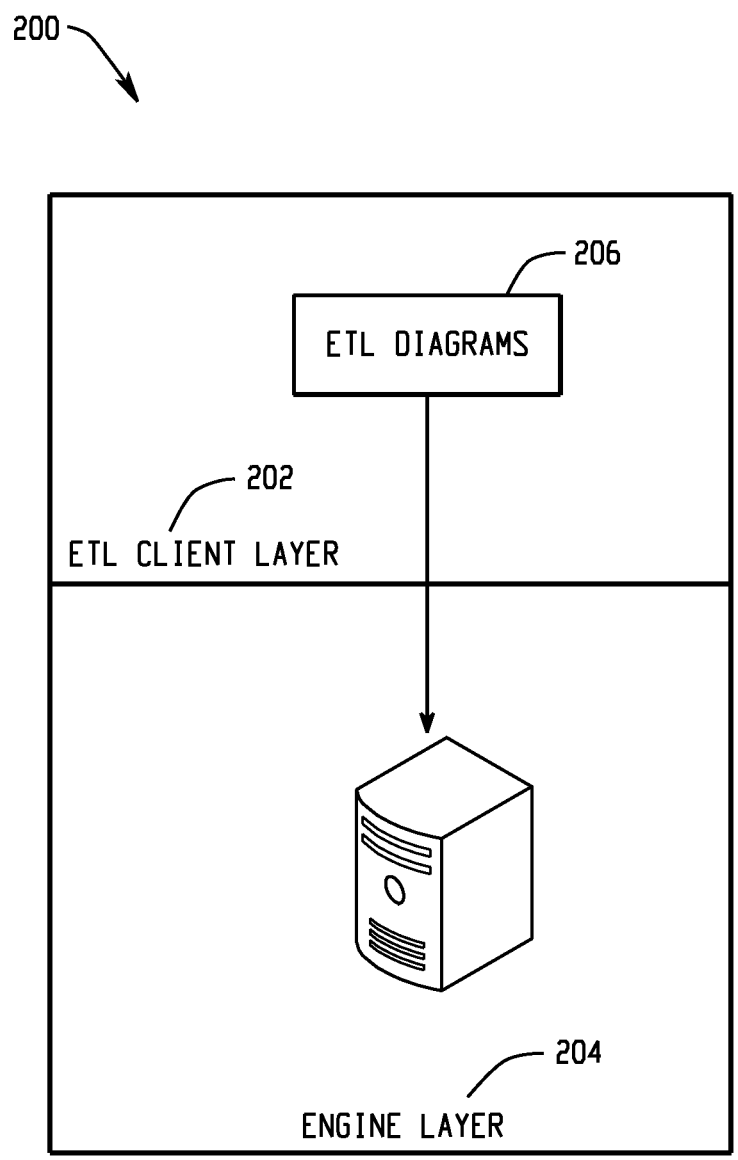
FIG. 2 depicts an example of a diagram for an ETL user interface processing system.

FIG. 2 depicts at 200 an example of a diagram for an ETL user interface processing system. As shown in FIG. 2, the ETL user interface processing system may include an ETL client layer 202, and an engine layer 204. Different steps of an ETL process, including data extraction, data transformation, and data loading, are physically carried out in the engine layer 204. The ETL client layer communicates with the engine layer 204, and renders information of the ETL process for external display to users. For example, the ETL user interface processing system may represent an ETL process through a hierarchy of levels (not shown). A level in the hierarchy may include one or more ETL diagrams 206 for display to users. The ETL client layer 202 may include a user interface, such as a GUI, and the ETL diagrams 204 may be displayed in the user interface. The users may build, review or modify the ETL process through the ETL diagrams 204 without knowing details of the engine layer 204, including the specifics of the underlying engine technology.

Figure 3:
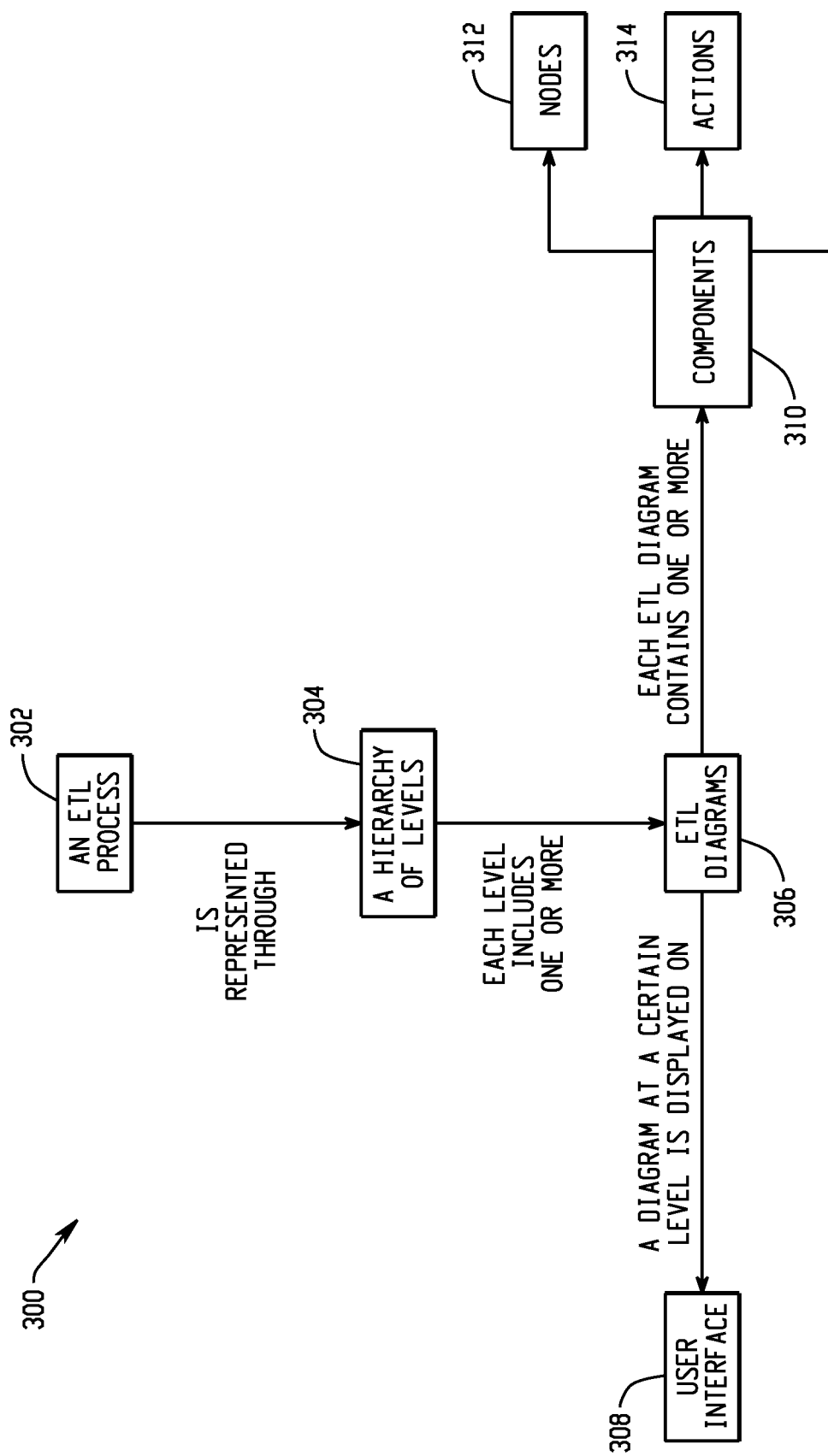
FIGS. 3-5 depict different examples of a configuration of software components for ETL user interface processing.

FIG. 3 depicts at 300 an example of a configuration of software components for ETL user interface processing. In this example, an ETL process 302 may be represented through a hierarchy of levels 304. A level in the hierarchy 304 may include one or more ETL diagrams 306. An ETL diagram at a certain level in the hierarchy 304 may be displayed in a user interface 308, such as a GUI, for users to build, review, or modify the ETL process 302.

For example, each ETL diagram may contain one or more components 310 representing transformations that are to be applied to data or jobs in the ETL process 302. For example, an ETL diagram may include nodes 312 representative of ETL-related entities and actions 314, that are valid (e.g., allowable) at a certain level of the ETL process 302. The actions valid for a certain level may include adding a node, deleting a node, or customizing a node. The users may build the ETL process 302 using the nodes and actions, and rely on the ETL diagram to encapsulate the complexity of the underlying engine technology, e.g., a Structured Query Language technology, a web services technology, a scripting-based technology, a data cleansing technology, etc.

Figure 4:
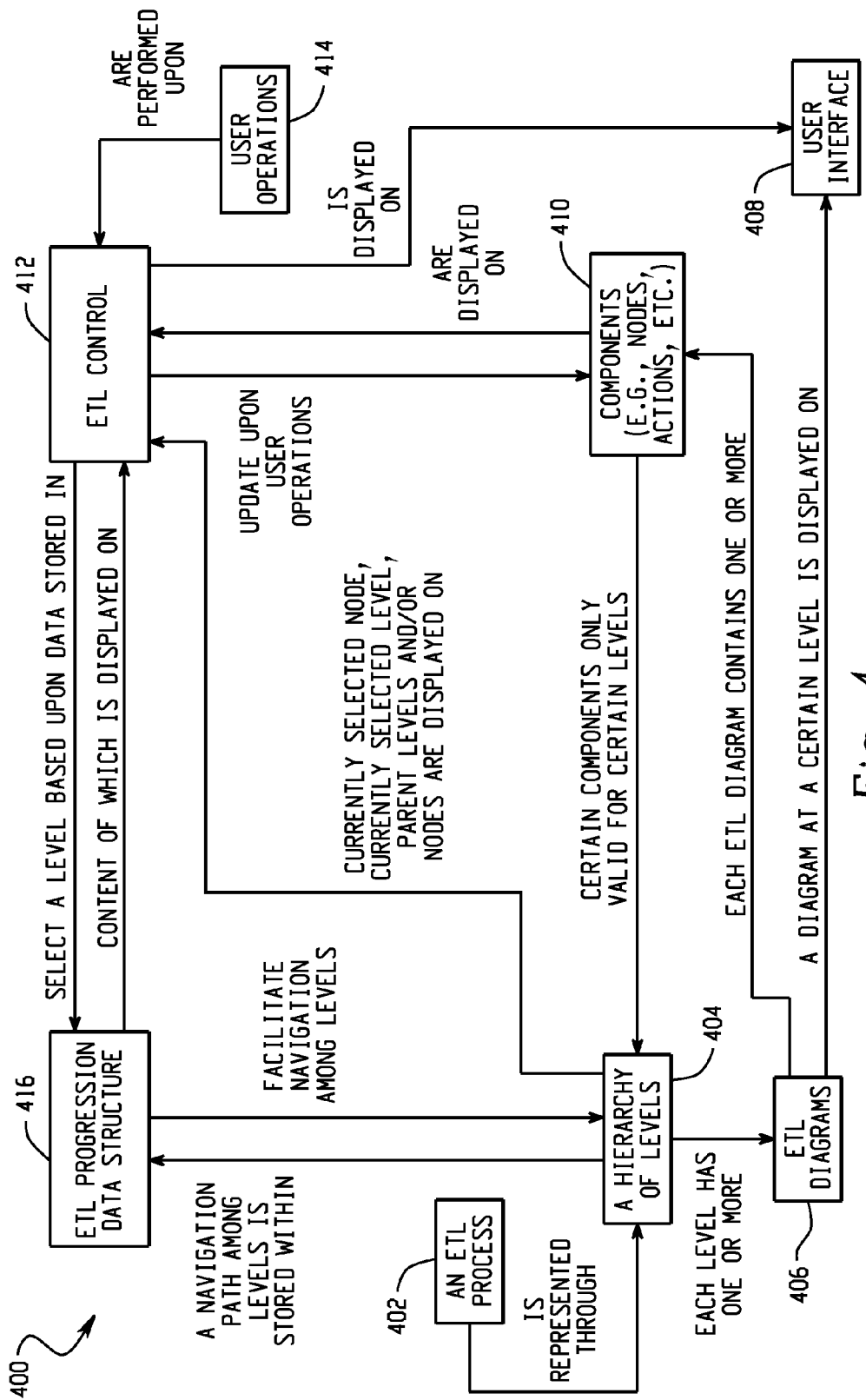

FIG. 4 depicts at 400 another example of a configuration of software components for ETL user interface processing. Similar to the example configuration shown in FIG. 3, an ETL process 402 may be represented through a hierarchy of levels 404 each of which may include one or more ETL diagrams 406. An ETL diagram at a particular level in the hierarchy 404 may be displayed in a user interface 408, and the displayed ETL diagram may contain one or more components 410, e.g., nodes representative of ETL-related entities and actions, etc. Certain components may be only valid for certain levels in the hierarchy of levels 404.

In addition, the example configuration shown in FIG. 4 includes an ETL control 412 that may be displayed in the user interface 408 as an ETL user interface component to receive user operations 414 for building, reviewing, or modifying the ETL process 402. For example, the components 410 of a particular level may be displayed in the ETL control 412. The ETL control 412 may update the components 410 based on the received user operations 414. Users may navigate among the hierarchy of levels 404 to review different levels of the ETL process 402, or to find a particular level to work on.

An ETL progression data structure 416 may be implemented to facilitate user navigation among the levels, and to store information related to a navigation path among the levels in the hierarchy 404. For example, the ETL progression data structure 416 may store data including information associated with a currently selected level or node, and parent ETL diagram information. The parent ETL diagram information may be related to one or more of the following: all previously visited levels and nodes, higher levels in the hierarchy 404, parent levels of the currently selected level, and parent nodes of the currently selected node.

Content of the ETL progression data structure 416 may be displayed in the ETL control 412 as part of a displayed ETL diagram. For example, a currently selected node/level, parent levels of the currently selected level, and/or parent nodes of the currently selected node may be displayed in the ETL control 412 as part of a displayed ETL diagram. From a displayed ETL diagram, users may determine which level of the hierarchy 404 they are currently working in, or navigate to a different ETL diagram based upon data stored in the ETL progression data structure 416. For example, a displayed ETL diagram may show a parent level of the currently selected level, and a user may select the parent level to navigate to a different ETL diagram of the parent level.

Figure 5:
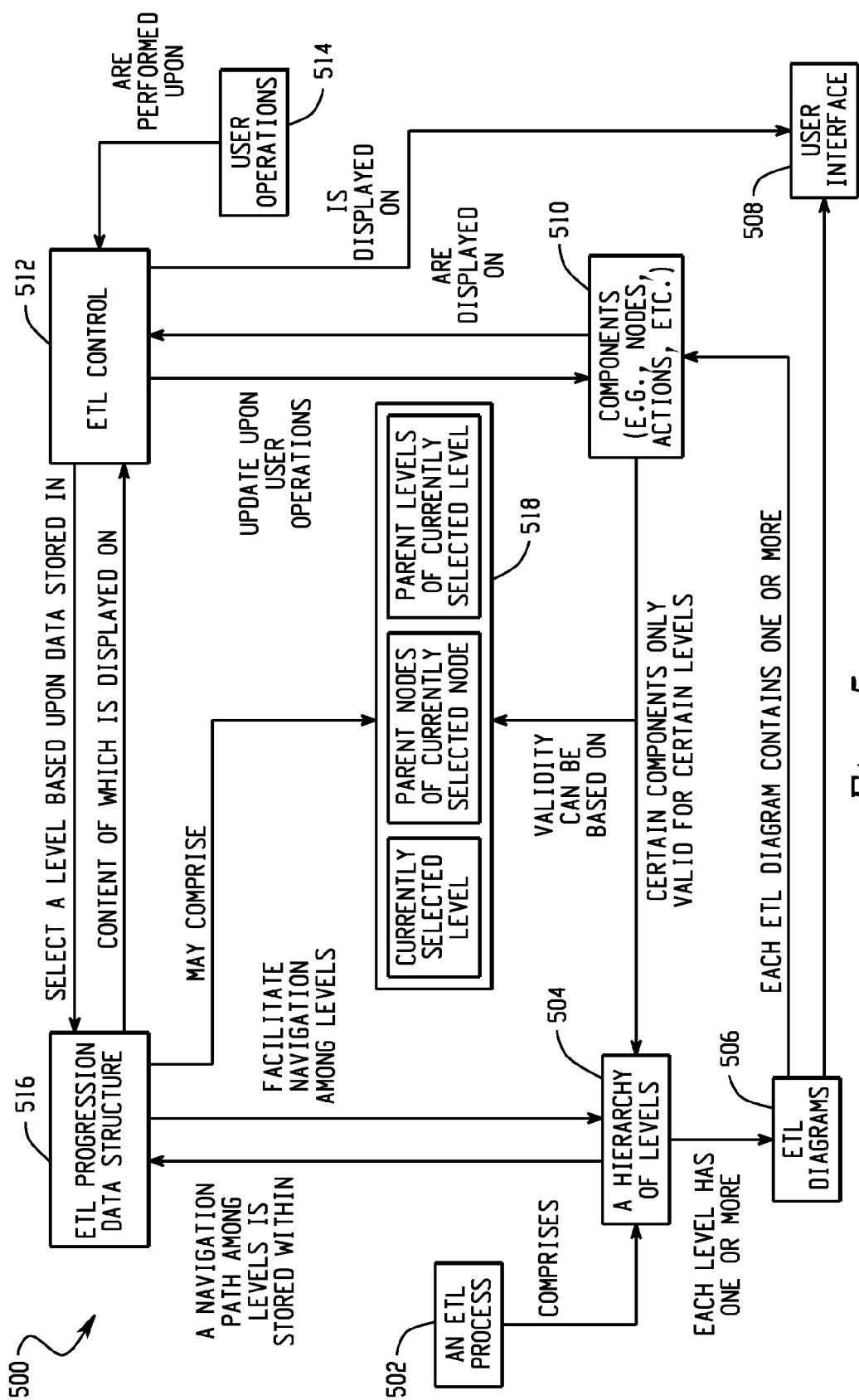

FIG. 5 depicts at 500 another example of a configuration of software components for ETL user interface processing. Similar to the example configuration shown in FIG. 4, an ETL process 502 may be represented through a hierarchy of levels 504 each of which may include one or more ETL diagrams 506. An ETL diagram may be displayed in a user interface 508 and may contain one or more components 510. Content of an ETL progression data structure 516 may be displayed in an ETL control 512 as part of a displayed ETL diagram.

In addition, the ETL progression data structure 516 may include ETL progression data 518, e.g., a currently selected level, parent nodes of a currently selected node, and parent levels of the currently selected level. Whether certain components are valid for a particular level in the hierarchy 504 may be determined based on the ETL progression data 518.

FIG. 6 depicts at 600 an example of a flow chart of ETL user interface processing. In this example, an ETL process may be updated through user operations on a displayed ETL diagram. The ETL process may be represented through a hierarchy of levels. A level in the hierarchy may include one or more ETL diagrams having ETL components representative of one or more ETL-related entities or actions. An ETL diagram may be displayed at 602. For example, the displayed ETL diagram includes a display of ETL progression data (e.g., parent ETL diagram information), and provides an indication of which ETL components are allowable specifically for the displayed ETL diagram. Determination as to which ETL components are allowable for the displayed ETL diagram may be based upon the ETL progression data (e.g., the parent ETL diagram information). For example, the parent ETL diagram information may be related to one or more of the following: higher levels in the hierarchy, parent levels of a currently selected level, parent nodes of a currently selected node, and all previously visited levels and nodes.

The ETL progression data (e.g., the parent ETL diagram information) may be used to navigate to a different ETL diagram within the hierarchy at 604. The ETL process may be updated based upon user-selected allowable components with respect to the displayed ETL diagram and the different ETL diagram at 606. The updated ETL process may be used to process data from one or more data sources for loading into one or more data targets.

FIG. 7 depicts at 700 another example of a flow chart of ETL user interface processing. In this example, navigation between ETL diagrams may be carried out, and an ETL process may be updated through user operations on a displayed ETL diagram after navigation. A level of a hierarchy of levels that represent the ETL process may include one or more diagrams having ETL components representative of one or more ETL-related entities or actions. An ETL diagram may be displayed for user operations at 702.

ETL progression data (e.g., the parent ETL diagram information) may be used to navigate to a different ETL diagram of a level within the hierarchy at 704. Upon navigation to the different ETL diagram, the different ETL diagram is displayed for user operations at 706. The ETL process is updated based upon allowable components that are selected with respect to the displayed different ETL diagram at 708. The updated ETL process is used to process data from one or more data sources for loading into one or more data targets.

Figure 8:
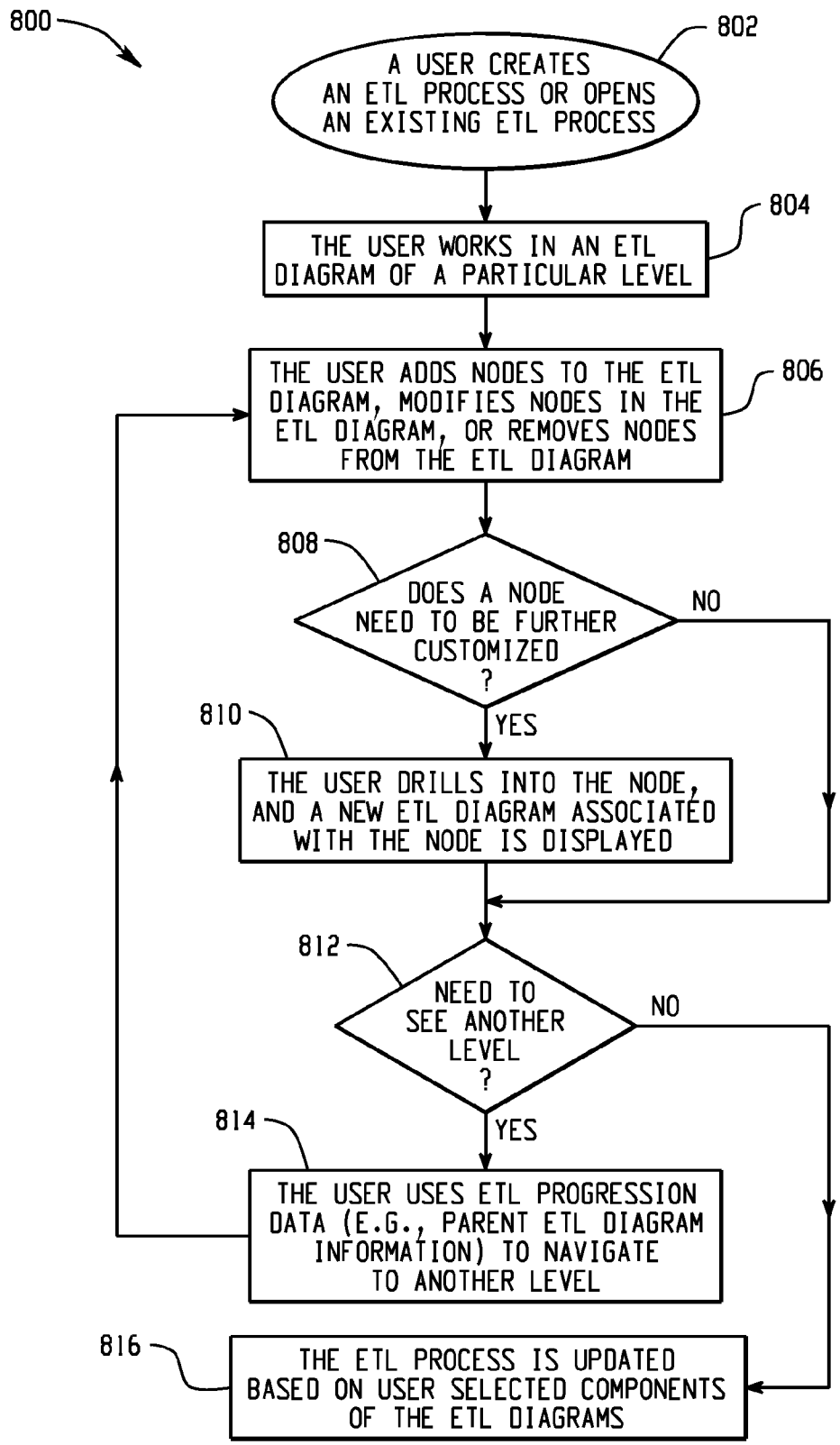

FIG. 8 depicts at 800 another example of a flow chart of ETL user interface processing. In this example, a user may build and/or navigate between ETL diagrams of an ETL process. A user may create the ETL process or open the preexisting ETL process at 802. The ETL process may be represented through a hierarchy of levels. Each level may include one or more ETL diagrams, and an ETL diagram may be displayed in a user interface, such as a GUI. The user may work in a displayed ETL diagram of a particular level at 804. An ETL diagram may contain one or more components representing transformations that are to be applied to data or jobs in the ETL process. For example, an ETL diagram may include nodes representative of ETL-related entities and actions, that are valid at a certain level of the ETL process. The actions valid for a certain level may include adding a node, deleting a node, or customizing a node.

The user may add nodes to the displayed ETL diagram, or remove nodes from the ETL diagram at 806. The user may determine if a node in the displayed ETL diagram needs to be further customized at 808. If the user decides to customize a node, the user may drill into the node, and a new ETL diagram associated with the node may be displayed at 810. ETL progression data (e.g., parent ETL diagram information, etc.) may be displayed as part of the new ETL diagram.

An option may be presented to the user if another level in the hierarchy needs to be explored at 812. If the user decides to go to another level, the user may navigate to the desired level using the ETL progression data (e.g., the parent ETL diagram information) at 814. Then proper user actions may be performed on the desired level after navigation at 806. If the user does not want to go to another level, the ETL process may be updated based on user-selected components of the ETL diagrams, including the selected nodes and the selected actions, at 816. The updated ETL process may be used to process data from data sources for loading into data targets.

Figure 9:
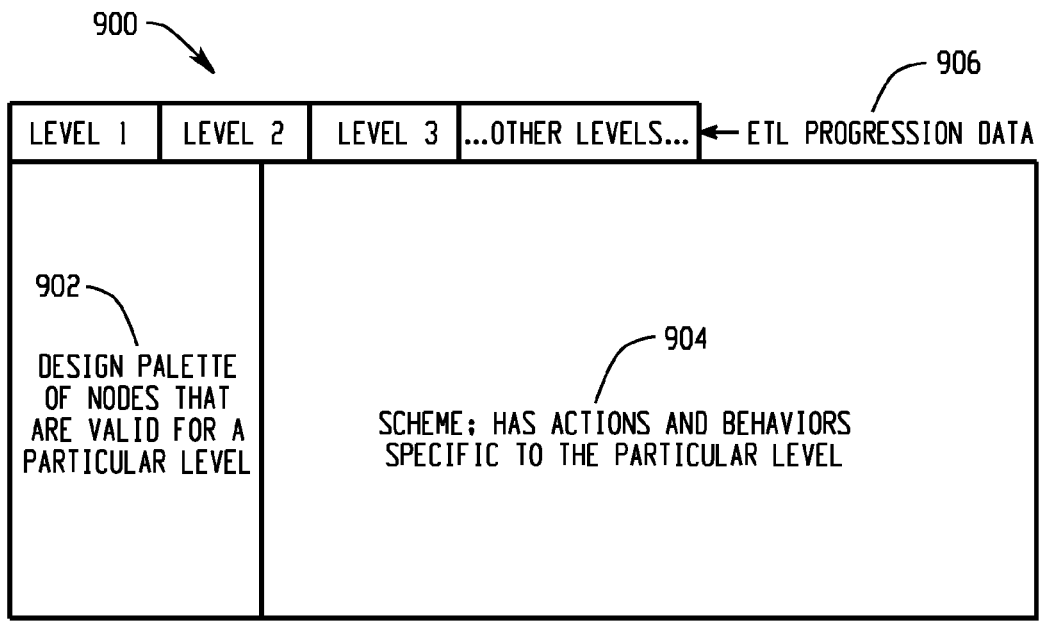
FIG. 9 depicts an example of a generic ETL diagram.

FIG. 9 depicts an example of a generic ETL diagram 900. As shown in FIG. 9, the ETL diagram 900 may include a design palette 902, a scheme 904, and ETL progression data 906. The design palette 902 may include valid nodes for a particular level of an ETL process. The scheme 904 may include actions and behaviors specific to the particular level. The ETL progression data 906 may include information associated with a currently selected level or node, and parent ETL diagram information. Only actions and behaviors that are allowed at the particular level may be made available in the ETL diagram 900.

Figure 10:
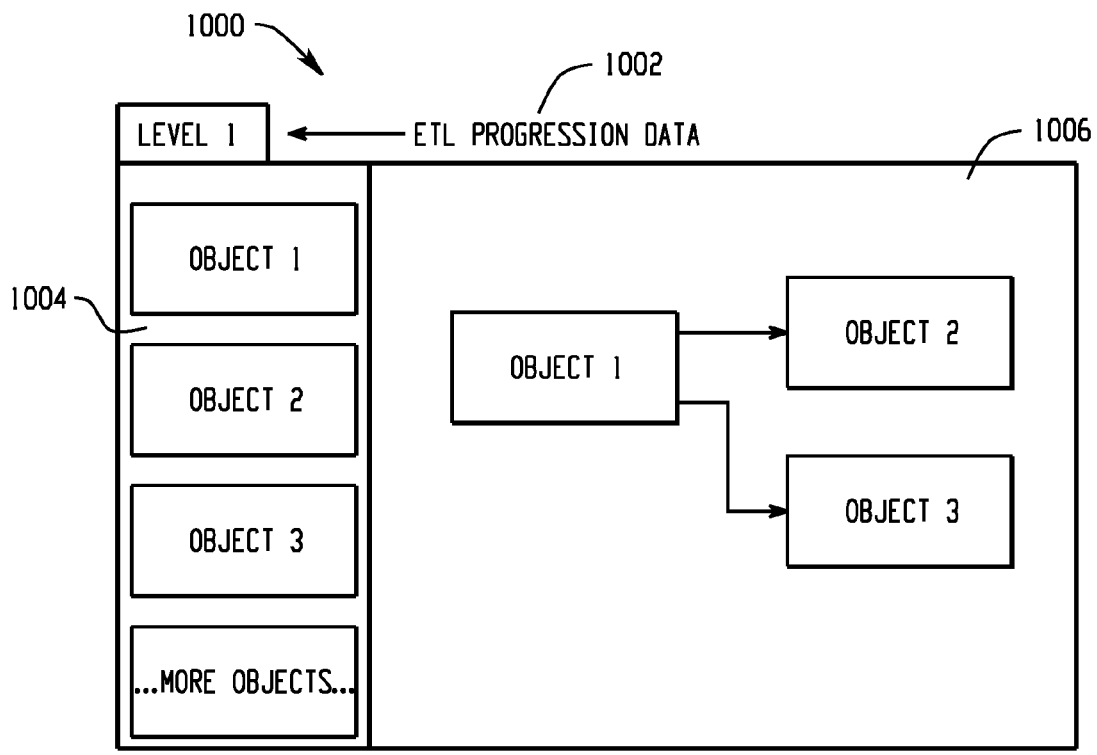
FIGS. 10-12 depict different examples of ETL diagrams at different levels of an ETL process.
Figure 11:
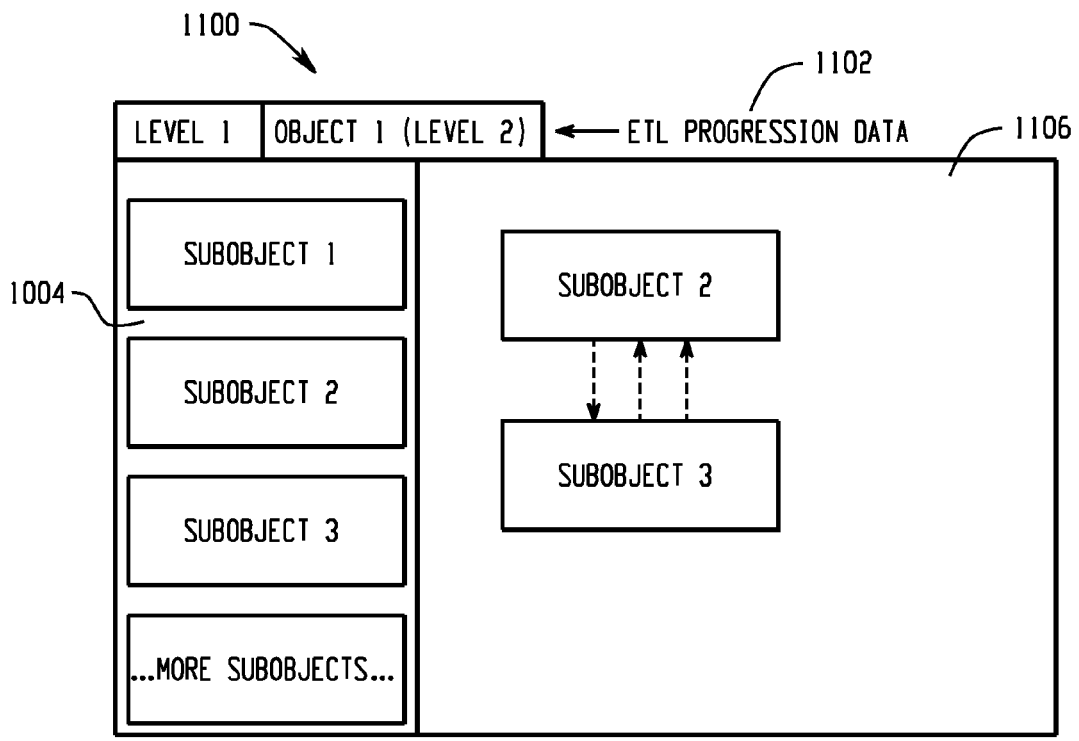
Figure 12:
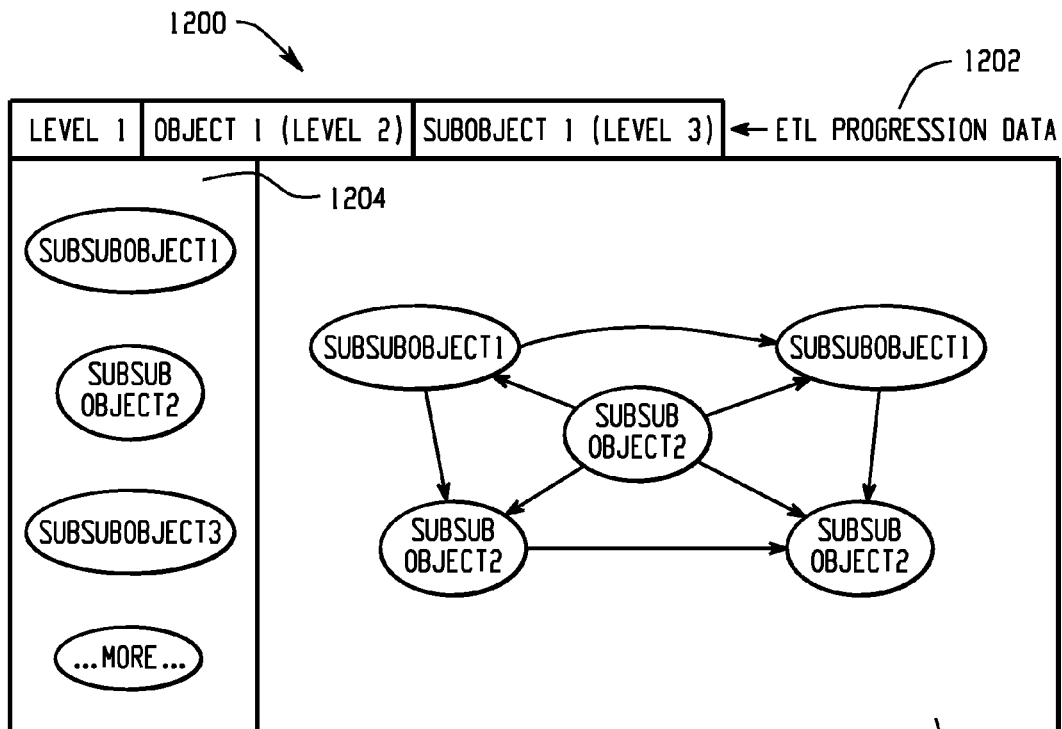

FIGS. 10-12 depict examples of ETL diagrams at different levels of an ETL process. With respect to the first example, FIG. 10 shows an ETL diagram 1000 at a top level of an ETL process. The ETL diagram 1000 may be displayed in a user interface, such as a GUI. ETL progression data 1002 displayed as part of the ETL diagram 1000 indicates that a user is currently working at the top level of the ETL process, e.g., "Level 1." A design palette 1004 shows nodes (e.g., objects) that the user is allowed to interact with, such as "Object 1," "Object 2," and "Object 3." A scheme 1006 displays allowed actions for the user to build a job or data flow of the ETL process using the objects displayed in the design palette 1004. For example, the user may double click the allowed actions shown in the scheme 1006 to create or modify the job or data flow. If the user decides to drill into a particular object, for example, "Object 1," then the displayed ETL diagram 1000 may be replaced with another ETL diagram at a lower level of the ETL process in the user interface, as shown in FIG. 11.

In FIG. 11, an ETL diagram 1100 is displayed when the user drills into the object "Object 1." ETL progression data 1102 may indicate that the user is currently working in "Object 1 (Level 2)." Also, the ETL progression data 1102 may show parent diagram information indicating that "Level 1" is the parent level of the currently selected level "Level 2." A design palette 1104 shows, at the currently selected level "Level 2," allowed nodes (e.g., objects) such as "SubObject 1," "SubObject 2," and "SubObject 3." A scheme 1106 displays allowed actions for the user to build a job or data flow at the currently selected level "Level 2." If the user decides to drill into a particular object at the currently selected level "Level 2," for example, "SubObject 1," then the displayed ETL diagram 1100 may be replaced with another ETL diagram at a lower level of the ETL process in the user interface, as shown in FIG. 12.

In FIG. 12, an ETL diagram 1200 is displayed when the user drills into the object "SubObject 1." ETL progression data 1202 may indicate that the user is currently working in "SubObject 1 (Level 3)." Also, the ETL progression data 1202 may show parent diagram information indicating that "Level 2" is the parent level of the currently selected level "Level 3," and "Object 1" is the parent node of the currently selected node "SubObject 1." Further, the parent diagram information may include information related to a previously visited level "Level 1." A design palette 1204 shows, at the currently selected level "Level 3," allowed nodes (e.g., objects) such as "SubSubObject1," "SubSubObject2," and "SubSubObject3." A scheme 1206 displays allowed actions for the user to build a job or data flow at the currently selected level "Level 3."

Figure 13:
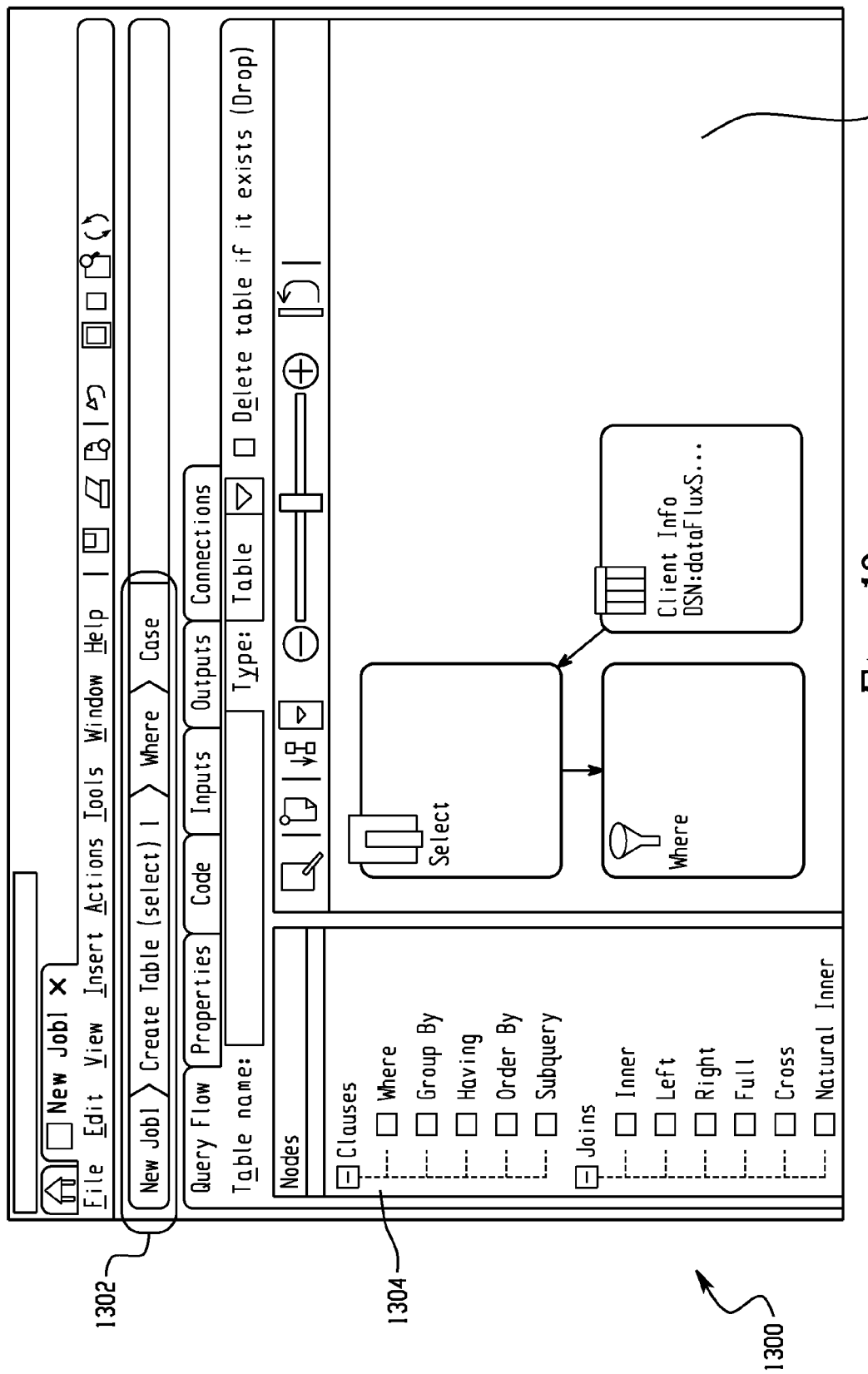
FIG. 13 depicts an example of an ETL diagram displayed in a GUI.

FIG. 13 depicts an example of an ETL diagram 1300 displayed in a GUI. ETL progression data 1302 displayed as part of the ETL diagram 1300 indicates that a user has drilled into four levels of an ETL process, e.g., "New Job1," "Create Table (select) 1," "Where," and "Case." The user is currently working at a second level "Create Table (select) 1." In this example, the user may intend to create a table. Initially, the user may create a new job flow by opening a "New Job1" level. An ETL diagram of "New Job1" may be displayed in the GUI. There may be certain nodes and actions allowed in "New Job1." Then the user may select one of the allowed nodes, e.g., "Create Table (select) 1." An ETL diagram of "Create Table (select) 1" may replace the ETL diagram of "New Job1."

For example, as indicated by the ETL progression data 1302, the user may have drilled into the node "Where" at the level of "Create Table (select) 1," and further drilled into the node "case" at the level of "Where." Then, the user may have decided to navigate to a different level. Eventually, the user navigates back to the level "Create Table (select) 1" based on the ETL progression data 1302. The ETL diagram 1300 of the level "Create Table (select) 1" is displayed in the GUI. A design palette 1304 shows nodes that the user is allowed to interact with, such as "Where," "Group By," and "Having." A scheme 1306 displays allowed actions for the user to build a job or data flow using the nodes displayed in the design palette 1304. In this example, the ETL progression data 1302 may have stored information associated with all previously visited nodes/levels.

Figure 14:
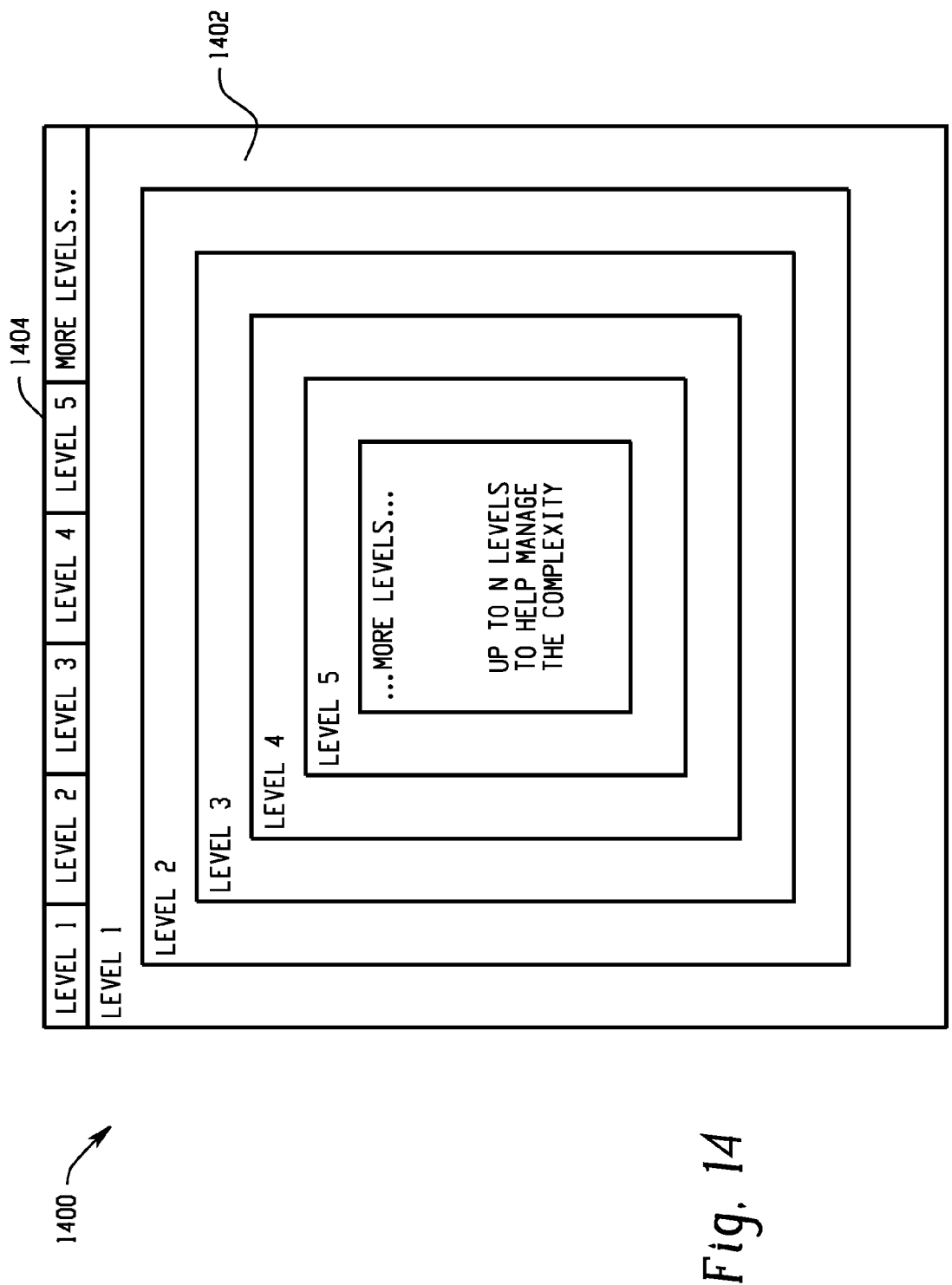
FIG. 14 depicts an example of an encapsulation design of an ETL process.

FIG. 14 depicts at 1400 an example of an encapsulation design of an ETL process. In this example, the encapsulation design of an ETL process may make it easy to see all available levels in the ETL process at a glance, and help a user manage the complexity of the ETL process. The user may be shown a hierarchy of levels that represent the ETL process, and the relationship of different levels in the hierarchy through an encapsulated diagram of different levels 1402, so that the user can understand how the ETL process is put together. Also the user may be shown which level of the ETL process he is working in through ETL progression data 1404. For example, if the user is currently working in "Level 3" based on the ETL progression data 1404, he may see, through the encapsulated diagram of different levels 1402, which components are in "Level 3," and "Level 3" is contained in "Level 2" which is also a part of "Level 1."

An ETL progression data structure described herein may support a memory technique that persists during user interaction with ETL diagrams, and allows the user to navigate among different levels of the ETL process with reduced efforts. For example, it may take the user several mouse clicks and/or manipulation of ETL diagrams to drill into a particular level/node of the ETL process. With the memory technique, the ETL progression data structure may record all or some levels/nodes the user previously visited, and allow the user to go back to any level/node he previously visited without repeating the mouse clicks and/or manipulation of ETL diagrams.

FIG. 15 depicts at 1500 an example of how the user may navigate among different levels of the ETL process based on the memory technique. In this example, the user may take different steps 1502 to interact with ETL diagrams 1504. An ETL progression data structure 1506 may record all or some levels/nodes the user visits, and content of the ETL progression data structure 1506 may be displayed to the user. At each step, the user may open a particular node at a certain level of the ETL process as shown at 1508, and the user may take further steps as shown at 1510.

For example, at step 1, the user starts out at a top level of the ETL process—"Level1." An ETL diagram of "Level1" may be displayed to the user in a user interface. Information associated with "Level1" may be stored in the ETL progression data structure 1506. At step 2, the user adds a node "Node1" to the top level, and drills into "Node1" to reach a lower level "Level2" in the ETL process. An ETL diagram of "Node1 (Level2)" may replace the ETL diagram of "Level1" in the user interface. Information associated with "Level1" and "Node1(Level2)" may be stored in the ETL progression data structure 1506. At this point, the user may navigate between "Level1" and "Node1(Level2)" easily, e.g., with a single mouse click.

At step 3, the user adds a node "Node2" to "Level2" and drills into "Node2" to reach another level "Level3" in the ETL process. An ETL diagram of "Node2(Level3)" may replace the ETL diagram of "Level1" in the user interface. Information associated with "Node2(Level3)" may be added to the ETL progression data structure 1506. The user can move back and forth among "Level1," "Node1(Level2)," and "Node2 (Level3)" easily as shown in steps 4-7.

The memory technique may enable the ETL progression data structure 1506 to remove information associated with nodes/levels that are no longer being worked on. At step 8, the user may choose to drill into a different node in "Level2," "NodeA." At this point, information associated with "Node2" may be removed from the ETL progression data structure 1506 because it is no longer needed. The user may navigate among "Level1," "Node1(Level2)," and "NodeA(Level3)" as needed. Steps 9-12 illustrate further how information associated with some nodes/levels that are no longer needed are removed from the ETL progression data structure 1506.

This written description uses examples to disclose the invention, including the best mode, and also to enable a person skilled in the art to make and use the invention. The patentable scope of the invention may include other examples. For example, a computer-implemented system and method can be configured for scoping a display of an ETL diagram to multiple levels, and allowing complex ETL diagrams with different components to be easily traversed. As another example, a computer-implemented system and method can be configured to handle the complexity of an ETL process for a user so that the user does not need to know all the rules required when interacting with a node in an ETL diagram. As another example, a computer-implemented system and method can be configured to display ETL diagrams within each other which share common behaviors, such as a Save action or other behaviors, and support a common user experience across levels of an ETL process, while user experience may still be customized among different levels when needed.

As an example, a computer-implemented system and method can be configured as described herein to encapsulate behaviors of the underlying engine technology of an ETL process so that users don't have to know specific details of the underlying engine technology in order to build a job or data flow of the ETL process, particularly when different components of an ETL flow may have different requirements in the underlying engine technology. As another example, a computer-implemented system and method can be configured as described herein for tailoring ETL diagrams to a specific technology, and yet presenting a common interface to users so that the user experience is similar enough for the users to understand basic common behaviors across different ETL diagrams. As another example, a computer-implemented system and method can be configured as described herein to visualize a complex set of diagrams in layers that provides scope so that a complex ETL flow can be more easily understood and viewed.

Figure 16:
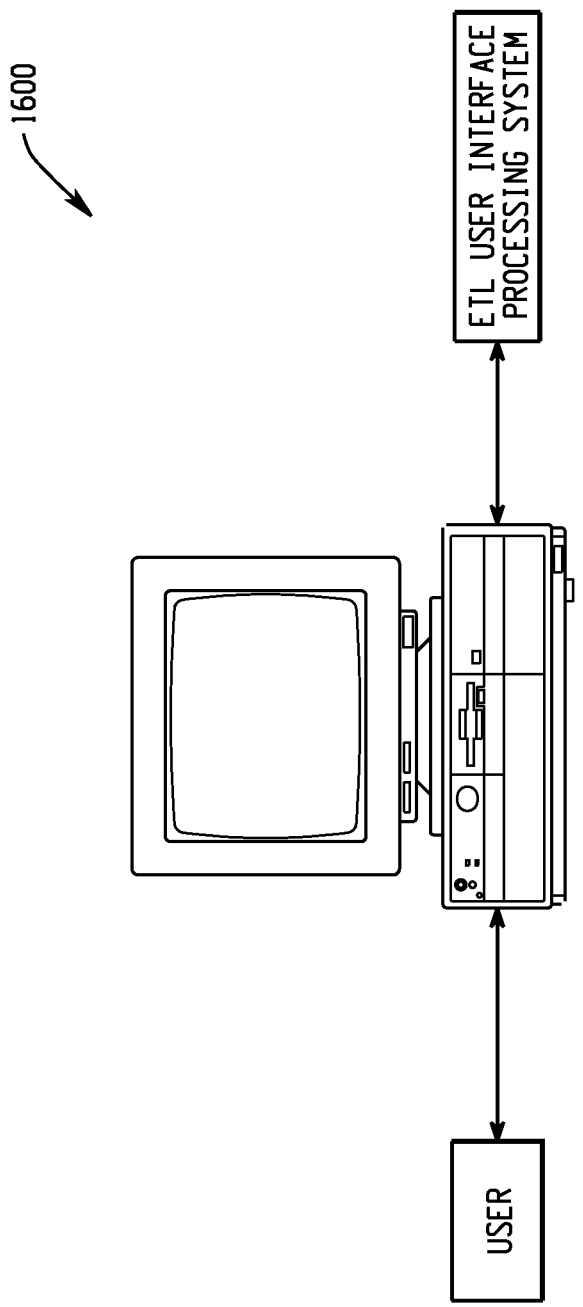
FIG. 16 depicts an ETL user interface processing system provided on a stand-alone computer for access by a user.

As another example, a computer-implemented system and method can be configured such that an ETL user interface processing system can be provided on a stand-alone computer for access by a user, such as shown at 1600 in FIG. 16.

As another example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   providing, by a computing device, a hierarchy of levels that represent an Extract, Transform, Load (ETL) process;
   displaying on a graphical interface a first ETL diagram in a first level of the hierarchy, wherein the first ETL diagram includes a first set of ETL components representative of one or more ETL-related actions or nodes corresponding to entities;
   receiving input corresponding to a selection of an ETL component in the first ETL diagram in the first level of the hierarchy, wherein the selected ETL component is associated with a second ETL diagram;
   updating ETL progression data in response to receiving the input, wherein the ETL progression data stores information associated with one or more nodes or levels navigated within the hierarchy, wherein the updated ETL progression data includes information associated with the selected ETL component, wherein the ETL progression data includes a graphical element corresponding to the second ETL diagram, wherein the second ETL diagram is in a second level of the hierarchy of levels, and wherein one or more graphical elements associated with the ETL progression data presents information related to one or more of the following: higher levels in the hierarchy, parent levels of the second ETL diagram, parent nodes of a currently selected node, and all previously-visited levels and nodes;
   displaying both the graphical element and the second ETL diagram on the graphical interface, wherein the second ETL diagram includes a second set of ETL components representative of one or more ETL-related actions or nodes corresponding to entities; and
   causing code corresponding to the ETL process to be generated, wherein causing the code to be generated includes processing data from one or more data sources for loading into one or more data targets in accordance with the ETL process.

2. The method of claim 1, wherein the ETL progression data further includes a parent graphical element corresponding to the first ETL diagram, the method further comprising:
   receiving input corresponding to a selection of the parent graphical element; and
   in response to receiving the input corresponding to the selection of the parent graphical element, displaying both the parent graphical element and the first ETL diagram on the graphical interface.

3. The method of claim 1, wherein selection of an ETL component in the second ETL diagram causes the ETL progression data to be further updated.

4. The method of claim 1, wherein the second ETL diagram provides an indication of which ETL components are allowable specifically for the second ETL diagram, wherein the method further comprises:
   updating the ETL process based upon allowable components that are selected with respect to the second ETL diagram, wherein the actions allowable for the second ETL diagram include at least one of: adding a node, removing a node, or customizing a node.

5. The method of claim 1, wherein the second ETL diagram provides an indication of which ETL components are allowable specifically for the second ETL diagram, wherein determination of one or more nodes allowable for the second ETL diagram is based upon the ETL progression data associated with the second ETL diagram.

6. The method of claim 1, wherein a navigation path among levels in the hierarchy is stored in an ETL progression data structure, and wherein content of the ETL progression data structure is presented via the graphical element corresponding to the second ETL diagram.

7. The method of claim 1, wherein when a new ETL component in the first ETL diagram is selected, information that is not related to the new ETL component, a new level of the new ETL component, parent levels and parent nodes of the new ETL component is removed from an ETL progression data structure.

8. The method of claim 1, wherein user selection to navigate to a different ETL diagram comprises selecting a different graphical element corresponding to the different ETL diagram based upon the ETL progression data.

9. The method of claim 1, further comprising:
   upon navigation to a different ETL diagram, displaying the different ETL diagram on the graphical interface; and
   updating the ETL process based upon user-selected allowable components with respect to the displayed different ETL diagram.

10. The method of claim 1, where a component selected by a user for the first ETL diagram represents transformations that are to be applied to data or jobs in the ETL process.

11. The method of claim 1, wherein details of underlying engine technology of the first ETL diagram is not needed for user operations on the first ETL diagram, and wherein the underlying engine technology is a Structured Query Language technology, a web services technology, a scripting-based technology, or a data cleansing technology.

12. The method of claim 1, wherein the one or more data sources include databases, message queues, tables, unstructured documents, structured documents, and pipes from web services calls, and wherein the one or more data targets include databases and data warehouses.

13. The method of claim 1, further comprising:
   updating the ETL process based upon allowable ETL components that are selected with respect to the first ETL diagram, wherein the updated ETL process is used to perform one or more of the following: migrating data, managing web services, integrating data flows, building message queues, and documenting a table of relationship.

14. A computer-implemented system for optimizing product placement in a hierarchy, comprising:
   one or more processors;
   one or more computer-readable storage media containing instructions configured to cause the one or more processors to perform operations including:
      providing a hierarchy of levels that represent an Extract, Transform, Load (ETL) process;
      displaying on a graphical interface a first ETL diagram in a first level of the hierarchy, wherein the first ETL diagram includes a first set of ETL components representative of one or more ETL-related actions or nodes corresponding to entities;
      receiving input corresponding to a selection of an ETL component in the first ETL diagram in the first level of the hierarchy, wherein the selected ETL component is associated with a second ETL diagram;
      updating ETL progression data in response to receiving the input, wherein the ETL progression data stores information associated with one or more nodes or levels navigated within the hierarchy, wherein the updated ETL progression data includes information associated with the selected ETL component, wherein the ETL progression data includes a graphical element corresponding to the second ETL diagram, wherein the second ETL diagram is in a second level of the hierarchy of levels, and wherein one or more graphical elements associated with the ETL progression data presents information related to one or more of the following: higher levels in the hierarchy, parent levels of the second ETL diagram, parent nodes of a currently selected node, and all previously-visited levels and nodes;
      displaying both the graphical element and the second ETL diagram on the graphical interface, wherein the second ETL diagram includes a second set of ETL components representative of one or more ETL-related actions or nodes corresponding to entities; and
      causing code corresponding to the ETL process to be generated, wherein causing the code to be generated includes processing data from one or more data sources for loading into one or more data targets in accordance with the ETL process.

15. The system of claim 14, wherein the ETL progression data further includes a parent graphical element corresponding to the first ETL diagram, and wherein the instructions are further configured to cause the one or more processors to perform operations including:
   receiving input corresponding to a selection of the parent graphical element; and
   in response to receiving the input corresponding to the selection of the parent graphical element, displaying both the parent graphical element and the first ETL diagram on the graphical interface.

16. The system of claim 14, wherein selection of an ETL component in the second ETL diagram causes the ETL progression data to be further updated.

17. The system of claim 14, wherein the second ETL diagram provides an indication of which ETL components are allowable specifically for the second ETL diagram, and wherein the instructions are further configured to cause the one or more processors to perform operations including:
   updating the ETL process based upon allowable components that are selected with respect to the second ETL diagram, wherein the actions allowable for the second ETL diagram include at least one of: adding a node, removing a node, or customizing a node.

18. The system of claim 14, wherein the second ETL diagram provides an indication of which ETL components are allowable specifically for the second ETL diagram, wherein determination of one or more nodes allowable for the second ETL diagram is based upon the ETL progression data associated with the second ETL diagram.

19. The system of claim 14, wherein a navigation path among levels in the hierarchy is stored in an ETL progression data structure, and wherein content of the ETL progression data structure is presented via the graphical element corresponding to the second ETL diagram.

20. The system of claim 14, wherein when a new ETL component in the first ETL diagram is selected, information that is not related to the new ETL component, a new level of the new ETL component, parent levels and parent nodes of the new ETL component is removed from an ETL progression data structure.

21. The system of claim 14, wherein user selection to navigate to a different ETL diagram comprises selecting a different graphical element corresponding to the different ETL diagram based upon the ETL progression data.

22. The system of claim 14, wherein the instructions are further configured to cause the one or more processors to perform operations including:
  upon navigation to a different ETL diagram, displaying the different ETL diagram on the graphical interface; and
  updating the ETL process based upon user-selected allowable components with respect to the displayed different ETL diagram.

23. The system of claim 14, where a component selected by a user for the first ETL diagram represents transformations that are to be applied to data or jobs in the ETL process.

24. The system of claim 14, wherein details of underlying engine technology of the first ETL diagram is not needed for user operations on the first ETL diagram, and wherein the underlying engine technology is a Structured Query Language technology, a web services technology, a scripting-based technology, or a data cleansing technology.

25. The system of claim 14, wherein the one or more data sources include databases, message queues, tables, unstructured documents, structured documents, and pipes from web services calls, and wherein the one or more data targets include databases and data warehouses.

26. The system of claim 14, wherein the instructions are further configured to cause the one or more processors to perform operations including:
  updating the ETL process based upon allowable ETL components that are selected with respect to the first ETL diagram, wherein the updated ETL process is used to perform one or more of the following: migrating data, managing web services, integrating data flows, building message queues, and documenting a table of relationship.

27. A computer-program product for optimizing product placement in a hierarchy, tangibly embodied in a machine-readable non-transitory storage medium, including a set of instructions configured to cause a data processing apparatus to:
  provide a hierarchy of levels that represent an Extract, Transform, Load (ETL) process;
  display on a graphical interface a first ETL diagram in a first level of the hierarchy, wherein the first ETL diagram includes a first set of ETL components representative of one or more ETL-related actions or nodes corresponding to entities;
  receive input corresponding to a selection of an ETL component in the first ETL diagram in the first level of the hierarchy, wherein the selected ETL component is associated with a second ETL diagram;
  update ETL progression data in response to receiving the input, wherein the ETL progression data stores information associated with one or more nodes or levels navigated within the hierarchy, wherein the updated ETL progression data includes information associated with the selected ETL component, wherein the ETL progression data includes a graphical element corresponding to the second ETL diagram, wherein the second ETL diagram is in a second level of the hierarchy of levels, and wherein one or more graphical elements associated with the ETL progression data presents information related to one or more of the following: higher levels in the hierarchy, parent levels of the second ETL diagram, parent nodes of a currently selected node, and all previously-visited levels and nodes;
  display both the graphical element and the second ETL diagram on the graphical interface, wherein the second ETL diagram includes a second set of ETL components representative of one or more ETL-related actions or nodes corresponding to entities; and
  cause code corresponding to the ETL process to be generated, wherein causing the code to be generated further includes a subset of instructions configured to cause the data processing apparatus to process data from one or more data sources for loading into one or more data targets in accordance with the ETL process.

28. The computer-program product of claim 27, wherein the ETL progression data further includes a parent graphical element corresponding to the first ETL diagram, and wherein the set of instructions are further configured to cause the data processing apparatus to:
  receive input corresponding to a selection of the parent graphical element; and
  in response to receiving the input corresponding to the selection of the parent graphical element, display both the parent graphical element and the first ETL diagram on the graphical interface.

29. The computer-program product of claim 27, wherein selection of an ETL component in the second ETL diagram causes the ETL progression data to be further updated.

30. The computer-program product of claim 27, wherein the second ETL diagram provides an indication of which ETL components are allowable specifically for the second ETL diagram, and wherein the set of instructions are further configured to cause the data processing apparatus to:
  update the ETL process based upon allowable components that are selected with respect to the second ETL diagram, wherein the actions allowable for the second ETL diagram include at least one of: adding a node, removing a node, or customizing a node.

31. The computer-program product of claim 27, wherein the second ETL diagram provides an indication of which ETL components are allowable specifically for the second ETL diagram, wherein determination of one or more nodes allowable for the second ETL diagram is based upon the ETL progression data associated with the second ETL diagram.

32. The computer-program product of claim 27, wherein a navigation path among levels in the hierarchy is stored in an ETL progression data structure, and wherein content of the ETL progression data structure is presented via the graphical element corresponding to the second ETL diagram.

33. The computer-program product of claim 27, wherein when a new ETL component in the first ETL diagram is selected, information that is not related to the new ETL component, a new level of the new ETL component, parent levels and parent nodes of the new ETL component is removed from an ETL progression data structure.

34. The computer-program product of claim 27, wherein user selection to navigate to a different ETL diagram comprises selecting a different graphical element corresponding to the different ETL diagram based upon the ETL progression data.

35. The computer-program product of claim 27, wherein the set of instructions are further configured to cause the data processing apparatus to:
  upon navigation to a different ETL diagram, display the different ETL diagram on the graphical interface; and
  update the ETL process based upon user-selected allowable components with respect to the displayed different ETL diagram.

36. The computer-program product of claim 27, where a component selected by a user for the first ETL diagram represents transformations that are to be applied to data or jobs in the ETL process.

37. The computer-program product of claim 27, wherein details of underlying engine technology of the first ETL diagram is not needed for user operations on the displayed ETL diagram, and wherein the underlying engine technology is a Structured Query Language technology, a web services technology, a scripting-based technology, or a data cleansing technology.

38. The computer-program product of claim 27, wherein the one or more data sources include databases, message queues, tables, unstructured documents, structured documents, and pipes from web services calls, and wherein the one or more data targets include databases and data warehouses.

39. The computer-program product of claim 27, wherein the set of instructions are further configured to cause the data processing apparatus to:
  update the ETL process based upon allowable ETL components that are selected with respect to the first ETL diagram, wherein the updated ETL process is used to perform one or more of the following: migrating data, managing web services, integrating data flows, building message queues, and documenting a table of relationship.

40. A computer-implemented method, comprising:
  providing, by a computing device, a hierarchy of levels that represent an Extract, Transform, Load (ETL) process;
  displaying on a graphical interface a first ETL diagram in a first level of the hierarchy, wherein the first ETL diagram includes a first set of ETL components representative of one or more ETL-related actions or nodes corresponding to entities;
  receiving input corresponding to a selection of an ETL component in the first ETL diagram in the first level of the hierarchy, wherein the selected ETL component is associated with a second ETL diagram;
  updating ETL progression data in response to receiving the input, wherein the ETL progression data stores information associated with one or more nodes or levels navigated within the hierarchy, wherein the updated ETL progression data includes information associated with the selected ETL component, wherein the ETL progression data includes a graphical element corresponding to the second ETL diagram, wherein a navigation path among levels in the hierarchy is stored in an ETL progression data structure, wherein content of the ETL progression data structure is presented via the graphical element corresponding to the second ETL diagram, and wherein the second ETL diagram is in a second level of the hierarchy of levels;
  displaying both the graphical element and the second ETL diagram on the graphical interface, wherein the second ETL diagram includes a second set of ETL components representative of one or more ETL-related actions or nodes corresponding to entities; and
  causing code corresponding to the ETL process to be generated, wherein causing the code to be generated includes processing data from one or more data sources for loading into one or more data targets in accordance with the ETL process.

* * * * *